June 13, 1961 B. BRIGHTMAN 2,988,601

TIME DIVISION MULTIPLEX TELEPHONE SYSTEM

Filed Aug. 20, 1958 4 Sheets-Sheet 1

INVENTOR.
BARRIE BRIGHTMAN

BY F. H. Henson

ATTORNEY

June 13, 1961 B. BRIGHTMAN 2,988,601

TIME DIVISION MULTIPLEX TELEPHONE SYSTEM

Filed Aug. 20, 1958 4 Sheets-Sheet 2

June 13, 1961 B. BRIGHTMAN 2,988,601

TIME DIVISION MULTIPLEX TELEPHONE SYSTEM

Filed Aug. 20, 1958 4 Sheets-Sheet 3

June 13, 1961 B. BRIGHTMAN 2,988,601

TIME DIVISION MULTIPLEX TELEPHONE SYSTEM

Filed Aug. 20, 1958 4 Sheets-Sheet 4

United States Patent Office 2,988,601

Patented June 13, 1961

2,988,601
TIME DIVISION MULTIPLEX TELEPHONE SYSTEM

Barrie Brightman, Rochester, N.Y., assignor to General Dynamics Corporation, Rochester, N.Y., a corporation of Delaware Filed Aug. 20, 1958, Ser. No. 756,120
5 Claims. (Cl. 179—15)

Figure 1:
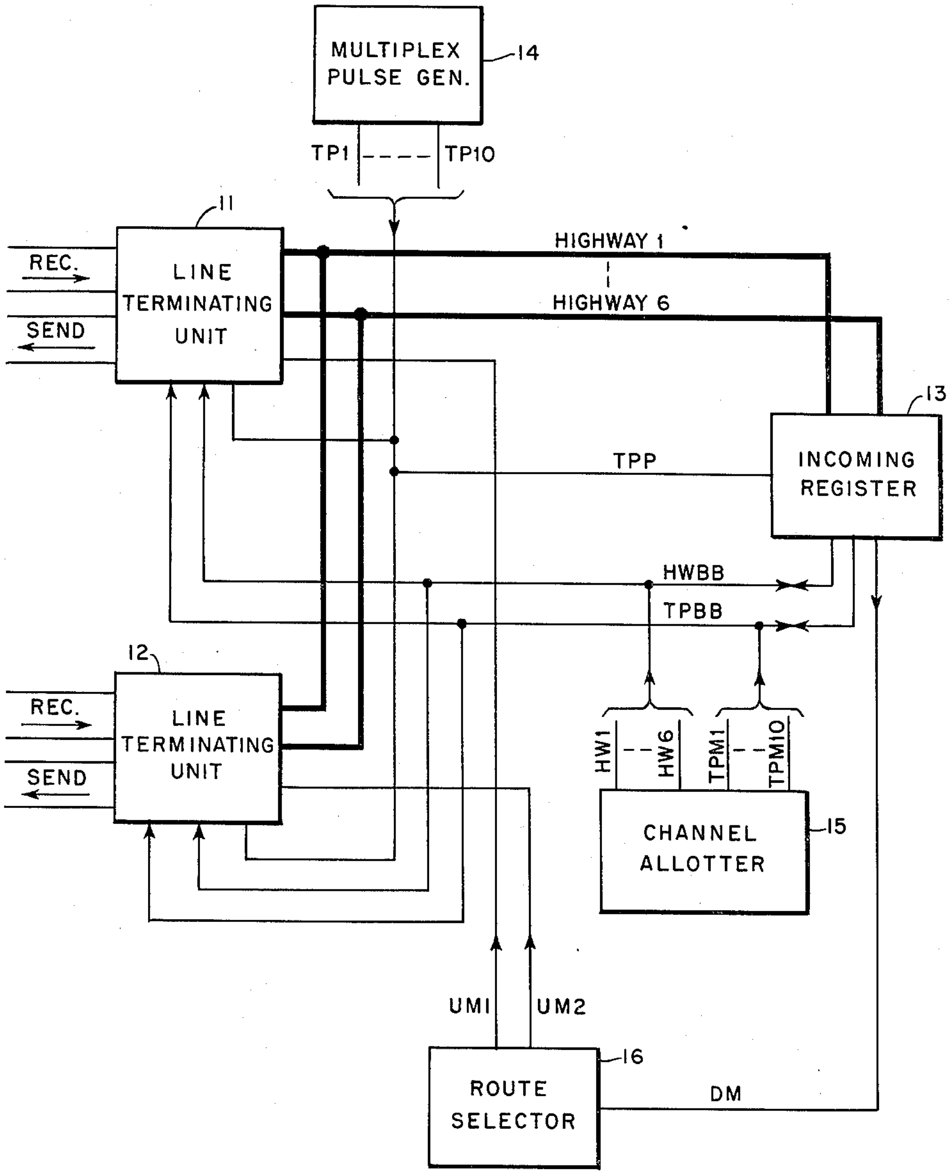

This invention relates in general to electronic switching telephone systems and, more particularly, to electronic switching telephone systems of the type which utilize time division channels for the transmission of speech signals between calling and called lines of the system.

In telephone systems of the type shown and described in copending application Serial No. 721,241, filed March 13, 1958, now Patent No. 2,947,819, and assigned to the same assignee as the present invention, the line terminating units of the system are interconnected for speech transmission purposes by a plurality of four-wire transmission highway networks of the time division channel type. A plurality of transmission highway networks is required in large offices or in non-blocking systems since it has been found that only approximately fifty channels can be carried on a single transmission highway network because of crosstalk between adjacent channels and because of the finite turn-on and turn-off times of the electronic switches or gating devices which connect the lines to the transmission network. In a four-wire system, it is, of uourse necessary that calling and called gates be provided in each line terminating unit since in a connection between any pair of calling and called lines the calling line must transmit over a first pair of network conductors and receive over the second pair of network conductors, while the called line must transmit over the second pair of network conductors and receive over the first pair of network conductors.

In the system disclosed in the above-identified application, calling and called gates for each highway transmission network are provided in each line terminating unit and either the calling or the called gate corresponding to the network assigned to a particular unit is activated by time position defining pulses corresponding to the channel assigned to that unit. Since the system is four-wire, eight electronic switches or gating devices are required for the calling and called gates for each transmission highway network in each line terminating unit of the system. Thus, in a system having six transmission highway networks, a total of forty-eight electronic switches or gating devices is required in each line terminating unit.

It is the general object of this invention to provide a new and improved electronic switching telephone system.

It is a more particular object of this invention to provide a new and improved electronic switching system of the type in which the line terminating units of the system are interconnected by a plurality of transmission highway networks of the time division channel type and which system comprises a minimum of equipment for selectively connecting each line to an assigned channel on any one of the networks.

In accordance with the present invention, each line terminating unit comprises a single calling gate and a single called gate multiply connected to a plurality of highway transmission network gates individually corresponding to the networks of the system. The highway gate corresponding to the network assigned to a particular line terminating unit is continuously activated for the duration of the call on the line terminated by that unit and the calling or called gate, depending upon whether the line is calling or called, respectively, is activated by the time position defining pulses corresponding to the channel assigned to that unit. Therefore, in a four-wire system having six transmission highway networks, twenty-four electronic switches or gating devices are required for the highway gates and eight electronic switches or gating devices are required for the calling and called gates. Thus in the system herein disclosed, a saving of sixteen gating devices per line is realized over the system disclosed in the above-identified application. The saving is, of course, magnified in systems comprising more transmission highway networks or more lines.

Further objects and advantages of the invention will be apparent as the following description proceeds and features of novelty which characterize the invention are pointed out in particularity in the claims annexed to and forming a part of this specification.

For a better understanding of the invention, reference may be had to the accompanying drawings which comprise four figures on four sheets.

FIG. 1 is a block diagram of the system, and

Figure 2:
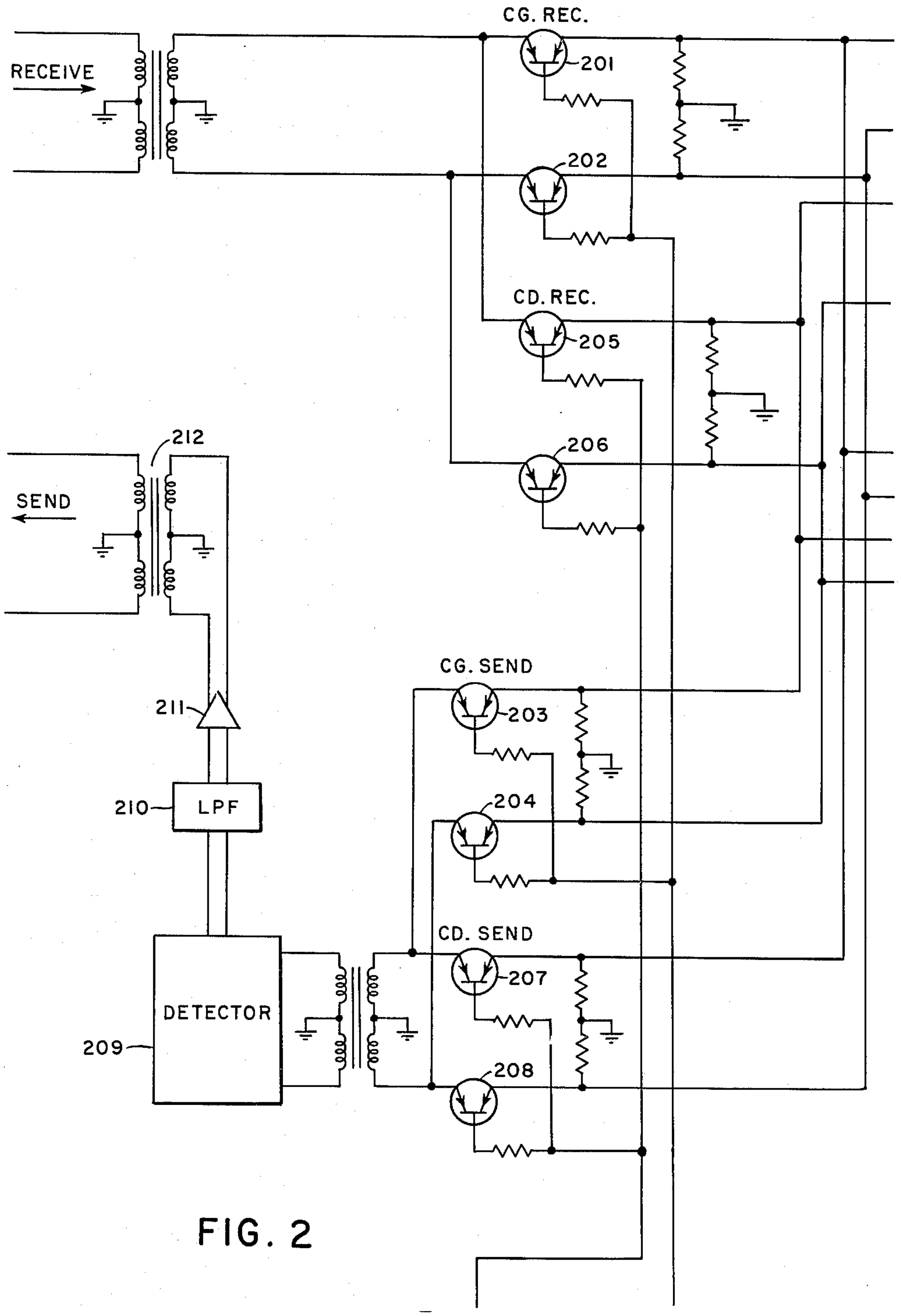
Figure 3:
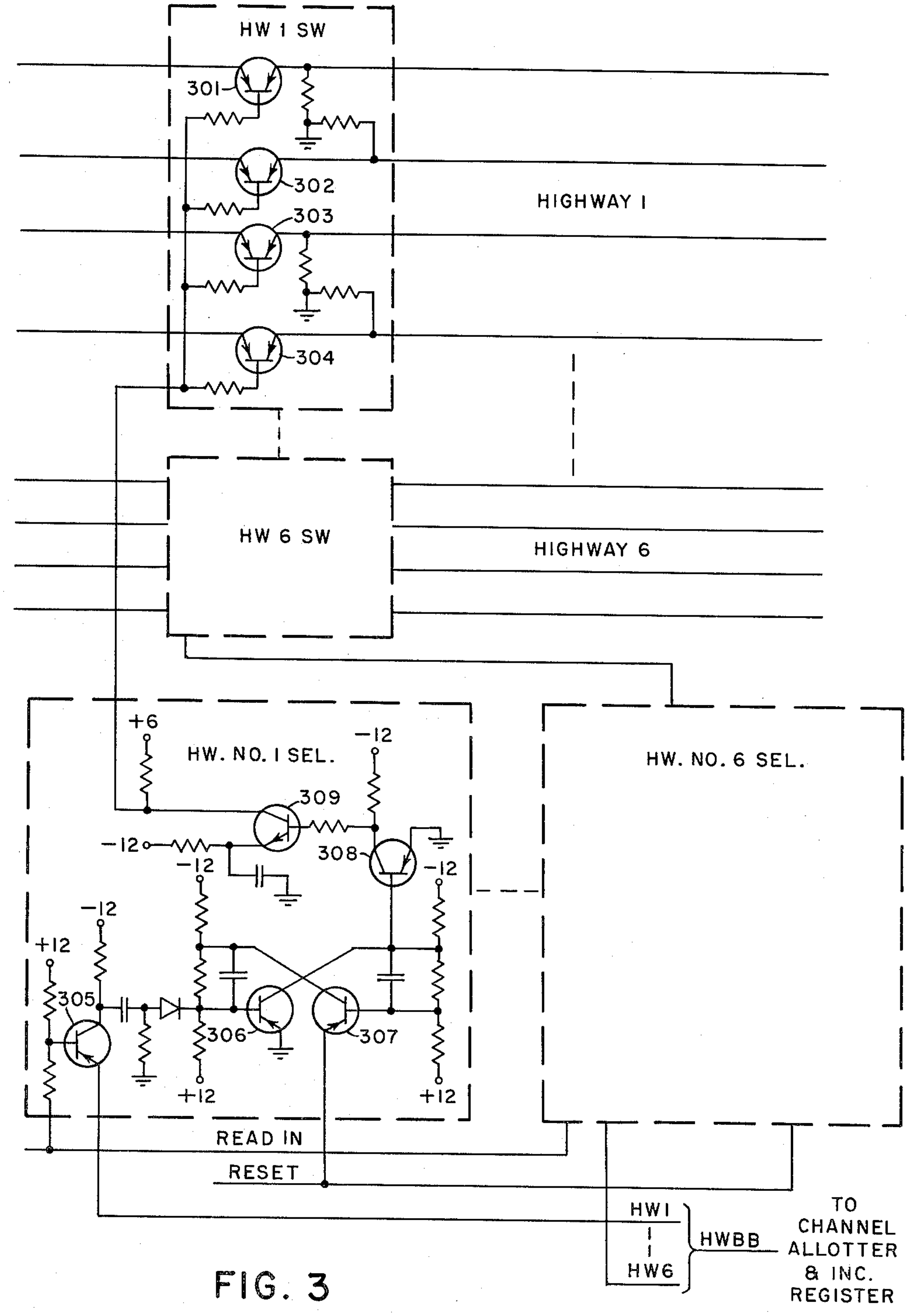
Figure 4:
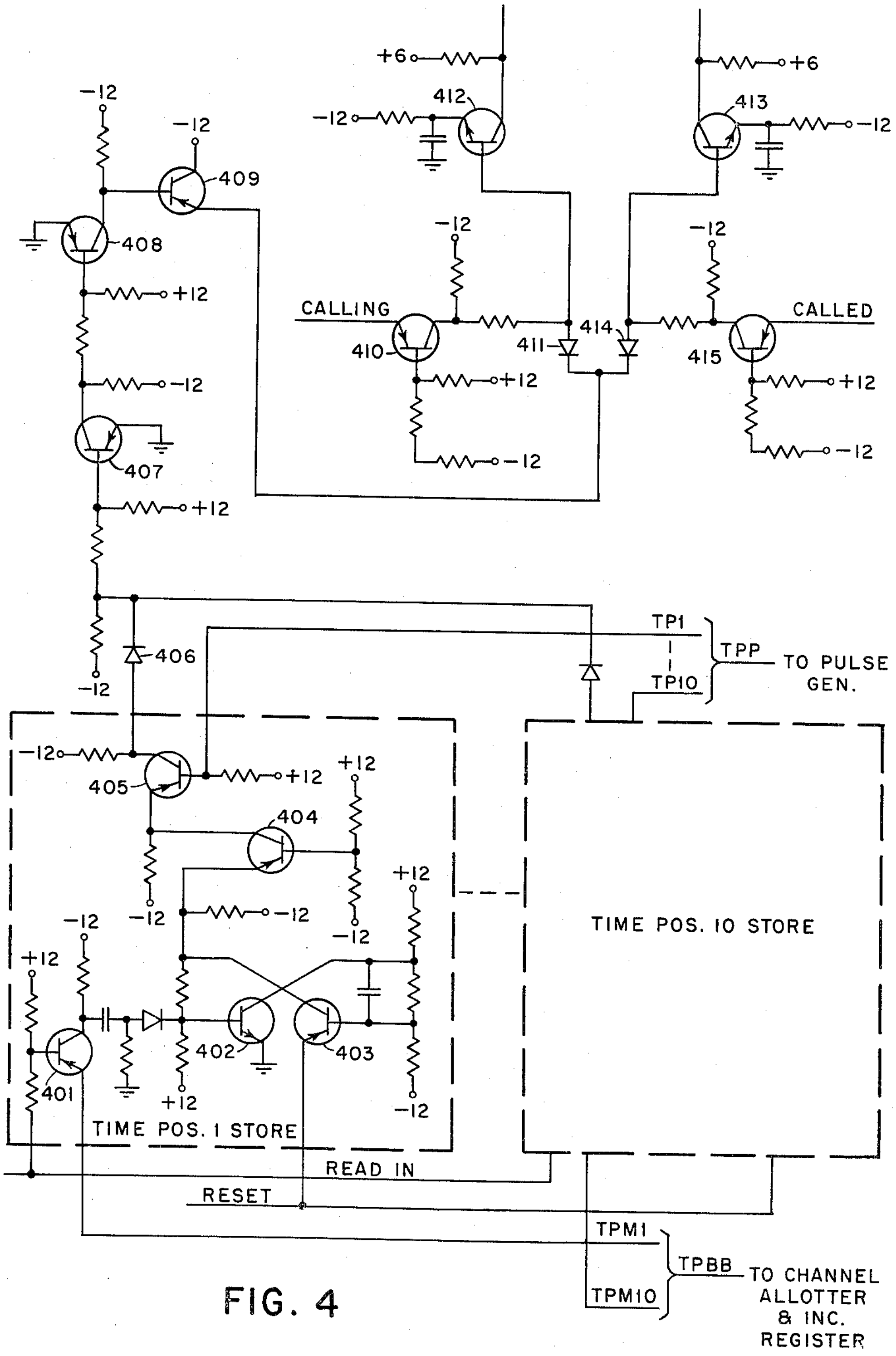

FIGS. 2, 3, and 4, when arranged with FIG. 3 to the right of FIG. 2 and FIG. 4 below FIG. 2, show circuit details of a portion of a line terminating unit suitable for use in the system shown in block form in FIG. 1.

The overall operation of the system in which the invention has been illustrated can best be understood by reference to the block diagram of FIG. 1. It is to be noted that FIG. 1 shows in block form only the equipment directly concerned with the present invention. A complete block diagram of the system is shown and described in the above-identified application. As shown in FIG. 1, the line terminating units, such as 11 and 12, and the incoming registers, such as 13, are interconnected by six transmission highway networks, labeled highway 1–highway 6. Each of the transmission highway networks comprises four wires carrying ten time division multiplex channels. Multiplex pulse generator 14 is provided in the system for the purpose of continuously providing recurring pulses which individually identify the ten channels in each highway network. The recurring time position pulses individually applied to the conductors TP1–TP10 by multiplex pulse generator 14 are routed over cable TPP to all of the line terminating units and to each of the incoming registers. The above-described pulses are used in each of the circuits to periodically activate switches within each of the circuits for the purpose of connecting that circuit to a selected one of the highway networks in a selected time division channel. The line terminating units and the incoming registers are also interconnected by a control network comprising bus bars HWBB and TPBB. Since the illustrated system includes six ten time position transmission networks, the highway network marking bus bars HWBB comprises six conductors and the time position marking bus bars TPBB comprise ten conductors. Channel allotter 15 is controlled to apply a D.-C. potential to one of the highway marking conductors and to one of the channel marking conductors at any given time for the purpose of individually assigning an idle channel to each calling line.

To illustrate the operation of the system, assume that channel allotter 15 is applying a D.-C. potential to highway marking conductor HW1 and to time position marking conductor TPM1 to thus identify channel 1 on highway 1 as the next channel to be assigned for use and that incoming register 13 has been assigned for use on the next call. When a call is initiated on the line terminated by unit 11, storage circuits in unit 11 and assigned register 13 are controlled to read in the highway and time position identifying marking appearing on the control network bus bars. Allotter 15 is then controlled to advance its setting and to apply marking signals corresponding to the next idle channel to bus bars HWBB and TPBB.

As previously explained, the storage circuit in unit 11 controls the continuous activation of the highway switch in unit 11 corresponding to the assigned highway for the duration of the call and the calling gate electronic switches in unit 11 are activated by the pulses appearing on the particular one of the conductors in cable TPP which corresponds to the assigned channel. Thus, in the assumed call, line terminating unit 11 is connected to highway 1 in time position 1 under control of the time position defining pulses appearing on conductor TP1. Similarly, the storage circuit in incoming register 13 controls the connection of that circuit to highway 1 in time position 1. Voice frequency dial signals received over the receive conductors of the trunk line terminated by unit 11 are transmitted in time division channel 1 on highway 1 to incoming register 13, signal samples received by register 13 are detected, and a digit register in register 13 is set in accordance with the digital values represented by the detected signals.

When register 13 is in readiness to read out registered information, allotter 15 is controlled to terminate the application of marking potentials to bus bars HWBB and TPBB and register 13 then applies marking potentials identifying the highway and channel assigned to the call being handled by that register to the same bus bars. Simultaneously therewith, route selector 16 is controlled by digit marking over conductors DM to select the desired called line terminating unit, such as 12, and to control the storage circuit in that unit to read in the information applied to the bus bars by register 13. In the assumed call, the storage circuits in the calling and called units now control the connection of their respective units to highway 1 during time position 1 for the transmission of speech and supervisory signals between the units for the duration of the call. Register 13 is, of course, released and freed for use on another call as soon the the connection is completed between the calling and called units.

Referring to FIGS. 2, 3, and 4, which show circuit details of a portion of a line terminating unit, it can be seen that the line terminating unit comprises a plurality of highway switches individually corresponding to the highway transmission networks. For example, highway switch 1, which comprises bilateral transistor switches 301–304, individually corresponds to four-wire transmission highway network 1 and highway switch 6 individually corresponds to highway 6. It can also be seen that the line terminating unit comprises a single calling gate, which comprises transistors 201–204, and a single called gate, which comprises transistors 205–208.

To illustrate the operation of the illustrated system, assume that the line terminated by the illustrated unit has just originated a call, that the channel allotter is applying ground potential to bust bar conductors TPM1 and HW1 to identify channel 1 on highway 1 as the assigned channel, that ground potential is applied to conductor Calling to indicate that the line is originating a call, and that negative potential is momentarily applied to conductor Read In. The derivation of all of these potentials, although not necessary for the understanding of the present invention, is shown and described in complete detail in the above-identified copending application. When negative potential is momentarily applied to conductor Read In, the base of the transistor corresponding to 305 in each highway selector goes negative but only transistor 305 in highway selector 1 is rendered conductive since ground potential is applied only to conductor HW1 by the channel allotter. Similarly, transistor 401 in the time position 1 store circuit is rendered conductive by negative potential on conductor Read In applied to its base and by ground potential on conductor TPM1 applied to its emitter.

When transistor 305 in highway selector 1 is rendered conductive, the flip-flop circuit comprising transistors 306 and 307 is triggered to the condition in which transistor 306 is non-conductive and transistor 307 is conductive. Similarly, when transistor 401 in the time position 1 store circuit is rendered conductive, the flip-flop circuit comprising transistors 402 and 403 is triggered to the condition in which both transistors are conductive. The identities of the assigned highway and channel are thus stored in the illustrated unit and when negative potential is removed from conductor Read In, different marking signals may be applied to the highway and time position marking bus bars without effect on the illustrated circuit.

When transistor 306 of the highway selector 1 flip-flop circuit becomes non-conductive, transistors 308 and 309 become conductive and the approximate minus six volt potential appearing at the collector of conducting transistor 309 is applied to the base electrodes of transistors 301–304, inclusive. Under these conditions, the base of each of the transistors 301–304 is negative with respect to both the so-called emitter collector electrodes of that transistor and the transistors are rendered fully conductive to bilaterally transmit signals between highway 1 and the common connection to the calling and called gates. The bilateral transistor switches in the remaining highway switches are, of course, held non-conductive since their base electrodes are returned to plus six volt potential at the collector of the transistor corresponding to 309 in each of the highway selector circuits 2–6. It is to be noted that the highway 1 switch is continuously activated for the duration of the call since flip-flop transistor 306 remains non-conductive until the flip-flop circuit is reset over conductor Reset at the termination of the call, as fully described in the above-identified application. When transistors 402 and 403 of the time position 1 store circuit become conductive, transistor 404 becomes conductive and ground potential is thereby applied to the emitter of transistor 405 to enable that transistor for conduction. The base of transistor 405 is individually connected to time position 1 conductor TP1 and when a negative pulse is received on that conductor, transistor 405 is rendered conductive and a positive-going pulse is coupled through diode 406 to the base of transistor 407. Diode 406 forms one input of a ten-input "OR" gate for positive pulses and the particular time position pulse coupled through the gate is determined by the setting of the time position store circuits. As just described, when the flip-flop circuit in time position 1 store circuit is operated, the pulse coupled through the "OR" gate occurs in time position 1.

Each positive pulse in time position 1 coupled through diode 406 is utilized to render transistor 407 non-conductive and each of the resulting negative-going pulses at the collector of transistor 407 renders transistor 408 conductive. The positive-going pulses at the collector of transistor 408 are coupled to the base of emitter follower transistor 409. The emitter of transistor 409 is returned to ground potential at the collector of conducting calling transistor 410 through diode 411. When transistor 408 is non-conductive, the emitter of transistor 409 stands at approximately minus twelve volts and pulse amplifier transistor 412 is held non-conductive. Now, when the emitter potential of transistor 409 rises to ground during time position 1, pulse amplifier 412 is rendered conductive to transmit a negative pulse to the calling send and receive gates of FIG. 2. It is to be noted that the pulses appearing at the emitter of transistor 409 are blocked from the base of pulse amplifier transistor 413, which controls the called send and receive gates, by diode 414 which is biased in the reverse direction because of the non-conduction of called transistor 415. Thus, a negative pulse is transmitted to the calling send and receive gates in time position 1 in each frame of the recurring pulse frames for the duration of the call under consideration.

Examining the calling receive gate, it can be seen that the gate comprises transistors 201 and 202. The base electrodes of transistors 201 and 202 are returned to the collector of pulse amplifier transistor 412, which stands at plus six volt potential except during time position 1. During time position 1, the collector of transistor 412 drops to approximately minus six volt potential and transistors 201 and 202 are rendered fully conductive to pass any signals appearing on the receive conductors of the line terminated by the illustrated unit. The signal samples passed by transistors 201 and 202 are applied to the upper pair of highway 1 conductors through conducting transistors 301 and 302. Similarly, the calling send transistors 203 and 204 are rendered conductive during time position 1 to pass signal samples coupled through conducting transistors 303 and 304 from the lower pair of conductors of highway 1. The signal samples passed by transistors 203 and 204 are detected by detector 209, the resulting demodulated signals are passed through low-pass filter 210 to remove any sampling frequency signal, amplified by amplifier 211, and coupled through transformer 212 to the send conductors of the trunk line.

When the illustrated unit is the selected called unit, the incoming register rather than the channel allotter applies the marking to bus bar conductors TPM1 and HW1, the highway selector and time position store circuits function exactly as previously described, and positive-going pulses in time position 1 appear at the emitter of emitter follower 409, as previously described. Since ground potential is applied to conductor Called rather than to conductor Calling, transistor 415 is conductive and negative pulses in time position 1 appear at the collector of pulse amplifier transistor 413. Under these conditions, the called gate bilateral transistors 205–208 are rendered conductive during time position 1. The signal samples passed by transistors 205 and 206 are applied to the lower pair of highway 1 conductors through conducting transistors 303 and 304. Similarly, the called send transistors 207 and 208 are rendered conductive during time position 1 to pass signal samples coupled through conducting transistors 301 and 302 from the upper pair of highway 1 conductors. It should be apparent that a calling unit transmits signals to the upper pair of highway conductors and receives signals from the lower pair of highway conductors while a called unit transmits signals to the lower pair of highway conductors and receives signals from the upper pair of highway conductors.

While there has been shown and described what is at present considered to be the preferred embodiment of the invention, modifications thereto will readily occur to those skilled in the art. It is not desired, therefore, that the invention be limited to the embodiment shown and described and it is intended to cover in the appended claims all such modifications as fall within the true spirit and scope of the invention.

What is claimed is:

1. In a telephone system, a line terminating unit, a plurality of transmission highway networks of the time division channel type, said unit comprising a plurality of first gates individually corresponding to said networks and a second gate, a common connection from said second gate to said plurality of first gates, said second gate being operative to pass signals between the line terminated by said unit and said common connection, each of said first gates being operative to pass signals between said common connection and the network corresponding to that gate, a pulse generator for developing recurring pulses corresponding to said time division channels, means for transmitting said pulses to said unit, means for assigning a network and a channel on that network to said unit, means in said unit for operating the first gate which corresponds to the assigned network, and means in said unit for utilizing the received pulses corresponding to the assigned channel to operate said second gate.

2. In a telephone system, a plurality of line terminating units, a plurality of transmission highway networks of the time division channel type interconnecting said units, each of said units comprising a plurality of first gates individually corresponding to said networks, a second gate, and a common connection from said second gate to said plurality of first gates, the second gate in each unit being operative to pass signals between the line terminated by the unit and the common connection in that unit, each of said first gates in each unit being operative to pass signals between the common connection in that unit and the network corresponding to that gate, a pulse generator for developing recurring pulses corresponding to said time division channels, means for transmitting said pulses to said units, means for assigning a network and an idle channel on that network to a calling one of said units, means in said calling unit for operating the first gate in that unit which corresponds to the assigned network, and means in said calling unit for utilizing the received pulses corresponding to the assigned channel to operate the second gate in that unit.

3. In a telephone system, a line terminating unit, a plurality of transmission highway networks of the time division channel type, said unit comprising a plurality of first gates individually corresponding to said networks, a second gate, and a common connection from said second gate to said plurality of first gates, said second gate being operative to pass signals between the line terminated by that unit and said common connection, each of said first gates being operative to pass signals between said common connection and the network corresponding to that gate, a pulse generator for developing recurring pulses corresponding to said time division channels, means for transmitting said pulses to said unit, means responsive to the initiation of a call on the line terminated by said unit for assigning a network and an idle channel on that network to said unit, means in said unit for continuously operating the first gate corresponding to the assigned network for the duration of the call on said line, and means in said unit for utilizing the received pulses corresponding to the assigned channel to operate said second gate.

4. In a telephone system, a line terminating unit, a plurality of transmission highway networks of the time division channel type, each of said networks comprising first and second pairs of conductors, said unit comprising a plurality of highway gates individually corresponding to said networks, third and fourth pairs of conductors common to said highway gates, each of said highway gates being operative to pass signals between the first and second pairs of conductors of its corresponding network and said third and fourth pairs of conductors, respectively, said unit comprising a calling gate operative to pass signals from the line terminated by said unit to said third pair of conductors and to pass signals from said fourth pair of conductors to the line terminated by said unit, said unit also comprising a called gate operative to pass signals from the line terminated by said unit to said fourth pair of conductors and to pass signals from said third pair of conductors to the line terminated by said unit, a pulse generator for developing recurring pulses corresponding to said time division channels, means for transmitting said pulses to said unit, means for assigning a network and a channel on that network to said unit, means in said unit for operating the highway gate which corresponds to the assigned network, means in said unit for utilizing the received pulses corresponding to the assigned channel to operate said calling gate when the line terminated by that unit is calling, and means in said unit for utilizing the received pulses corresponding to the assigned channel to operate said called gate when the line terminated by that unit is called.

5. In a telephone system, a plurality of line terminating units, a plurality of transmission highway networks of the time division channel type, each of said networks comprising first and second pairs of conductors, each of said units comprising a plurality of highway gates individually corresponding to said networks, a calling gate, a called gate, and third and fourth pairs of conductors, each of said highway gates in each unit being operative to pass signals between the first and second pairs of conductors of its corresponding network and said third and fourth pairs of conductors, respectively, in that unit, the calling gate in each unit being operative to pass signals from the line terminated by that unit to the third pair of conductors in that unit and to pass signals from the fourth pair of conductors in that unit to the line terminated by that unit, the called gate in each unit being operative to pass signals from the line terminated by that unit to the fourth pair of conductors in that unit and to pass signals from the third pair of conductors in that unit to the line terminated by that unit, a pulse generator for developing recurring pulses corresponding to said time division channels, means for transmitting said pulses to said units, means for assigning a network and an idle channel on that network to pairs of calling and called ones of said units, means in each unit for operating the highway gate corresponding to the network assigned to that unit, means in each calling unit for utilizing the received pulses corresponding to the channel assigned to that unit for operating the calling gate in that unit, and means in each called unit for utilizing the received pulses corresponding to the channel assigned to that unit for operating the called gate in that unit.

References Cited in the file of this patent

UNITED STATES PATENTS

| | | |
|---|---|---|
| 2,619,548 | Lesti | Nov. 25, 1952 |
| 2,747,021 | Chubb et al. | May 22, 1956 |
| 2,754,367 | Levy | July 10, 1956 |
| 2,848,544 | Trousdale | Aug. 19, 1958 |